(No Model.) 3 Sheets—Sheet 1.
A. T. CLASON.
MACHINE FOR PINNING OUT HAT BODIES.
No. 427,554. Patented May 13, 1890.
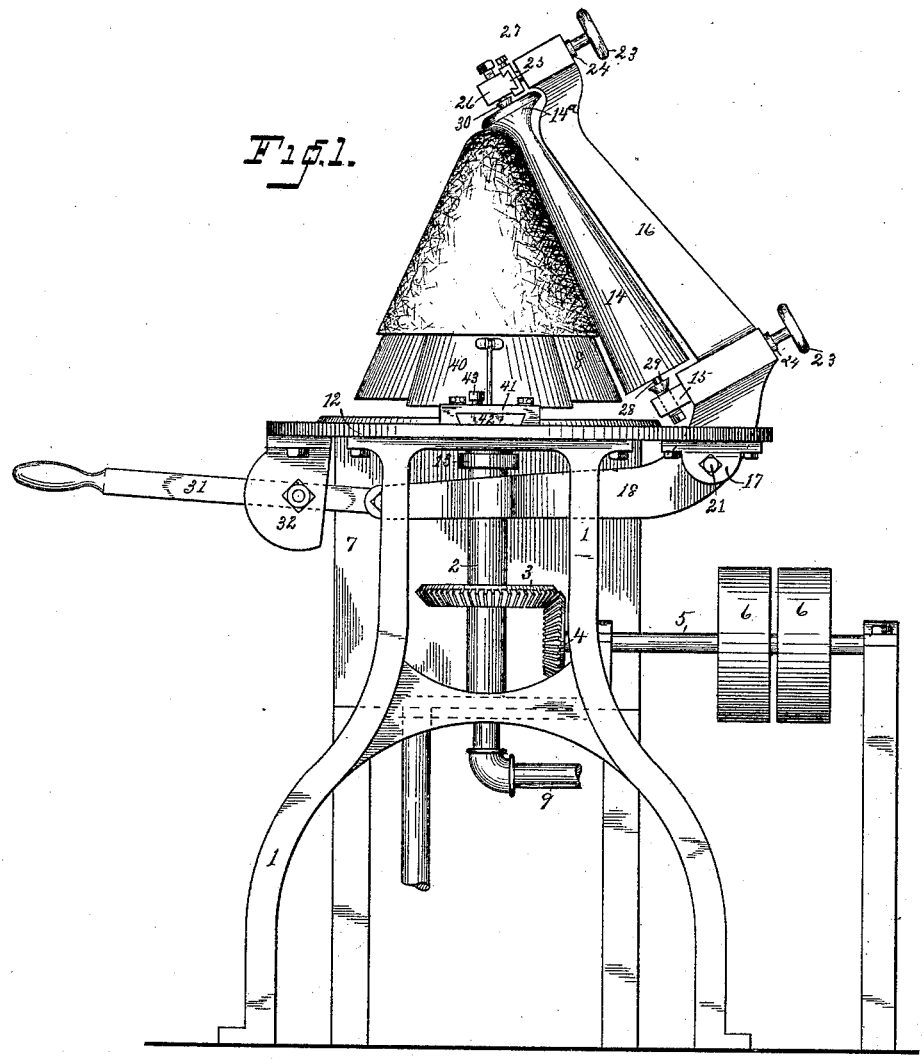
Witnesses
C. M. Newman
E. F. Pettit
Inventor
Abraham T. Clason
By H. M. Wooster
Atty.

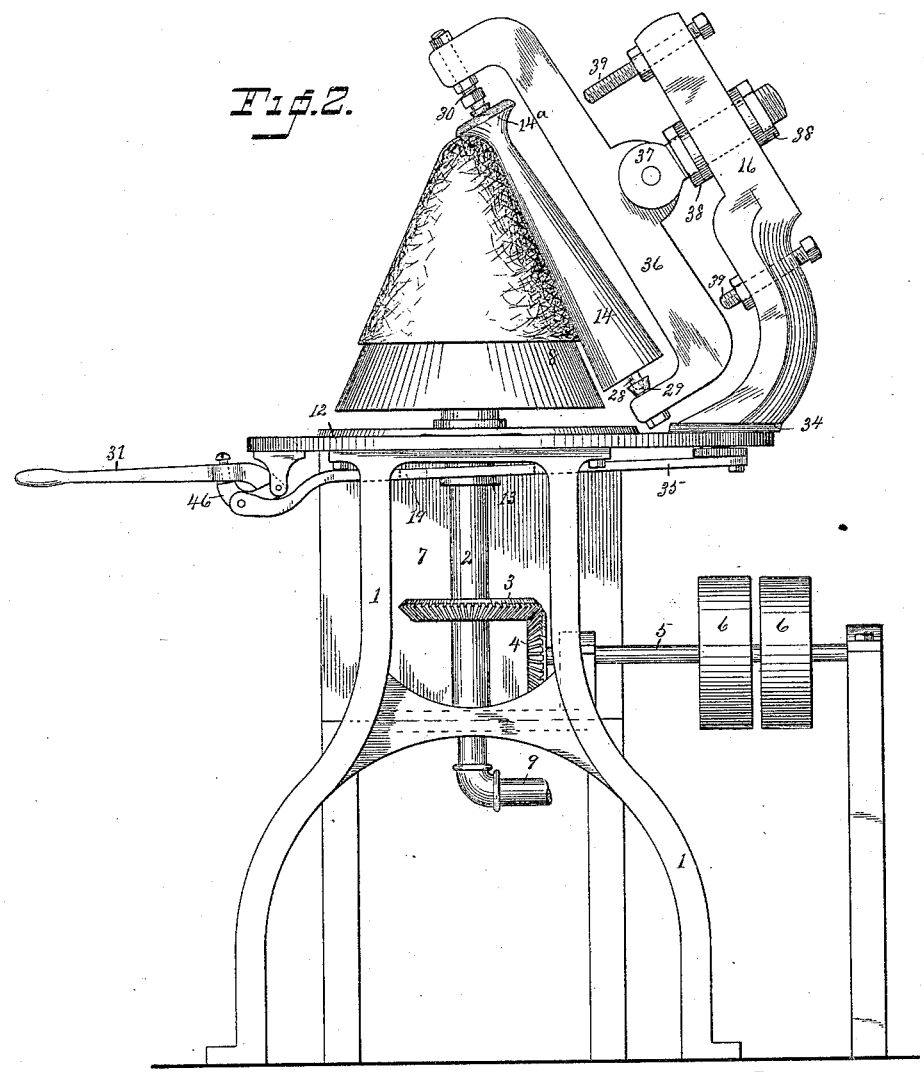

(No Model.) 3 Sheets—Sheet 3.
A. T. CLASON.
MACHINE FOR PINNING OUT HAT BODIES.
No. 427,554. Patented May 13, 1890.
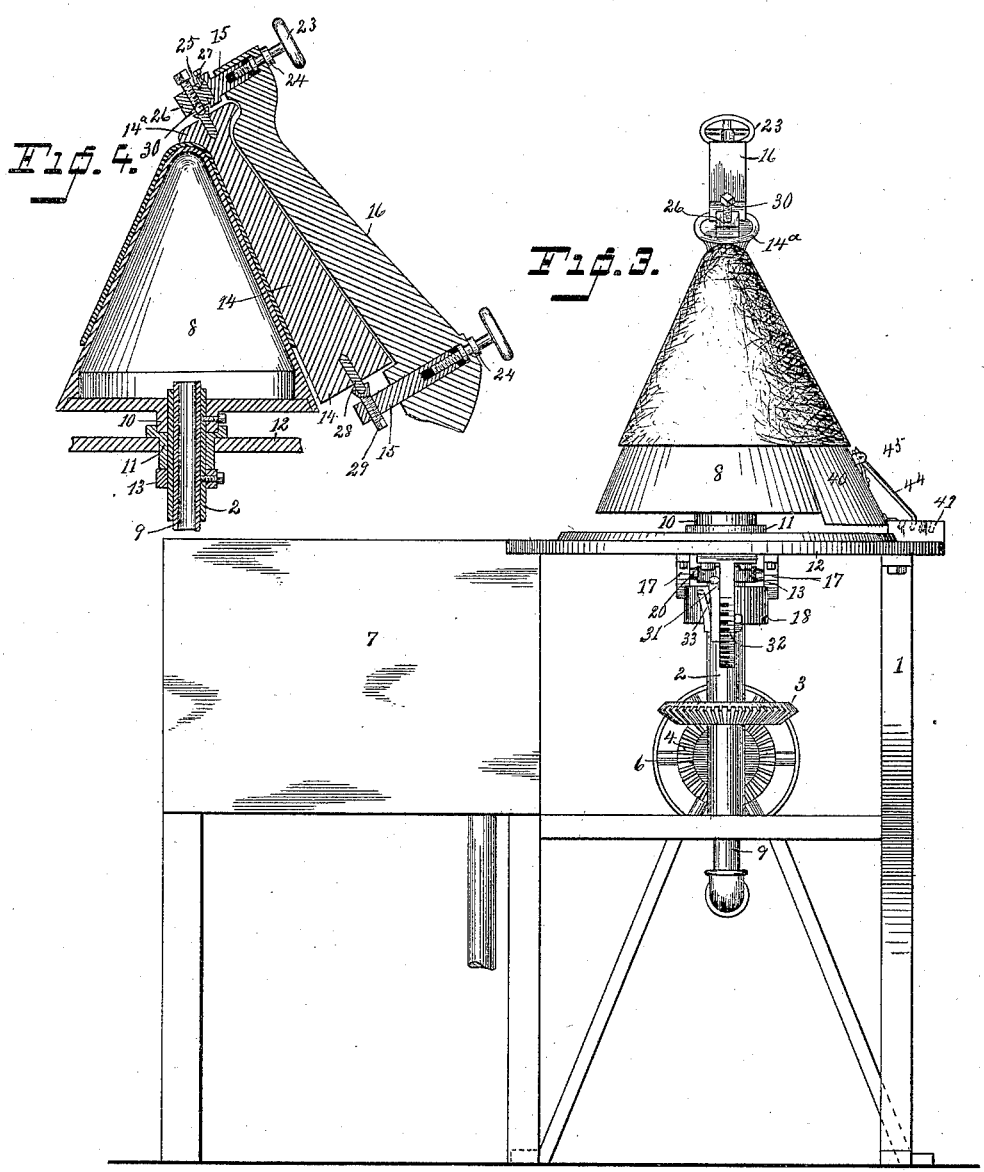

UNITED STATES PATENT OFFICE.

ABRAHAM T. CLASON, OF DANBURY, CONNECTICUT.

MACHINE FOR PINNING OUT HAT-BODIES.

SPECIFICATION forming part of Letters Patent No. 427,554, dated May 13, 1890.

Application filed February 18, 1889. Serial No. 300,316. (No model.)

*To all whom it may concern:*

Be it known that I, ABRAHAM T. CLASON, a citizen of the United States, residing at Danbury, in the county of Fairfield and State of Connecticut, have invented certain new and useful Improvements in Machines for Pinning Out Hat-Bodies; and I do hereby declare the following to be a full, clear, and exact description of the invention, such as will enable others skilled in the art to which it appertains to make and use the same.

My invention relates to the manufacture of hats, and has for its object to devise novel mechanism for pinning out the bodies, removing croze-marks, &c. In order that these results may be accomplished at slight cost to the manufacturer and at a high rate of speed, I have devised the novel machine of which the following description, in connection with the accompanying drawings, is a specification, numbers being used to denote the several parts.

Figure 1 is an end elevation of a machine complete and in use, illustrating one way in which I have carried my invention into effect; Fig. 2, a similar view illustrating another way in which I have carried my invention into effect, the details of construction being somewhat varied, but without changing the principle of the invention in the slightest; Fig. 3, a front elevation corresponding with Fig. 1; Fig. 4, a section of the cone, roller, arm, &c., corresponding with Fig. 1; Fig. 5, a reverse view of the operating-lever, locking-plate, &c., as in Fig. 1, detached; and Fig. 6 is a detail of the lower end of the arm detached.

1 denotes frame-work, and 2 a hollow shaft, suitably journaled therein and driven in any preferred manner. In the present instance I have shown said shaft as provided with a bevel-gear 3, which meshes with bevel-gear 4 on a driving-shaft 5, said shaft being shown as provided with belt-pulleys 6, one of which in practice is fixed and the other loose.

7 is a tank for water, which is maintained at a scalding temperature by the admission of steam or in any suitable manner.

8 denotes the rotating cone, which is secured to the upper end of shaft 2, is made steam-tight, and is kept heated by steam, which enters through a pipe 9, said pipe passing up through the hollow shaft, which turns freely thereon. Upon the under side of the cone is a hub 10, the lower end of which rests in a socket in a flanged sleeve 11, the latter passing through an opening in the bed of the machine, which I have designated by 12. The sleeve is rigidly secured to the bed, and hub 10 is secured to shaft 2 in any suitable manner—for example, by a screw and set-screw, as shown in the drawings. In order to prevent the cone from being lifted by strong pressure of steam, a collar 13 is secured to shaft 2 just below the flanged sleeve. The entire downward pressure—that is, the weight of the cone and shaft—is upon the flanged sleeve, the socket serving simply as an oil-cup. Should there be an upward pressure at any time, caused by the steam within the cone, that will be taken up by the collar, which will bear upon the lower end of the flanged sleeve, the latter being rigidly secured to the bed-plate, as clearly shown.

14 denotes the conical working or squeezing roller, which is formed with a suitable taper to correspond with the cone. I thus insure that the cone and roller shall revolve together without slipping and without friction, counteract any tendency of the hat-body to work upward, and also avoid any downward pull upon the hat-body, which would seriously interfere with the desired felting action.

In practice I preferably form an enlargement 14ª at the end of the roller, which curves over the end of the cone, so as to cause the latter to act clear to the tip of the hat-body. This roller is journaled in blocks 15, carried by swinging arm 16, which passes through a slot in the bed and is pivoted between brackets 17, on the under side thereof. The lower end of said arm consists of a shank 18, which lies at an acute angle to the main portion of the arm and passes horizontally across under the bed, said shank being provided with an opening 19, through which shaft 2 passes without contact. In order that the swinging arm may move freely, be perfectly firm, and easily adjusted to compensate for wear, I preferably form sockets in the ends of trunnions 20 on opposite sides of the arm, and pivot the latter by means of pointed screws 21, which pass through the brackets and engage said sockets. As it is necessary, furthermore, that the roller should be perfectly firm, and also readily adjustable, inward, outward, and laterally, I provide sockets 22 in the arms to receive blocks 15, and adjust the blocks in the sockets by means of screws 23, having hand-wheels, which are held in position by collars 24, fastened by set-screws, or in any suitable manner. It will be seen that this construction enables me to adjust either or both ends of the roller toward or from the cone. In order to provide lateral adjustment for the roller, I form a dovetail groove in one or both of the blocks 15, the upper one only being shown in the drawings as provided with a groove, (see Fig. 4,) said groove being engaged by a dovetail 25 on a sliding block 26, said block being locked in position after adjustment by a set-screw 27. The special manner in which the working-roller is journaled is of course not an essential feature of my invention. I preferably, however, provide a pin 28 at the lower end of the roller, which rests in a step 29, whose shank is screw-threaded to engage the lower block 15, thus making the bearing readily adjustable. At the upper end of the roller I provide a step 30, which is engaged by a pin in sliding block 26, thus making the upper bearing readily adjustable. As already stated, the lower block 15 may also be provided with a sliding block 26, if preferred. In practice, however, I find that ample lateral adjustment of the roller can be secured by making the upper end only of the roller adjustable laterally.

In the forms shown in Figs. 1 and 4 the arm and working-roller are controlled by means of an operating-lever 31, pivoted to the outer end of shank 18, and also pivoted to a plate 32, which is rigidly secured to the bed, and is provided with notches adapted to be engaged by a spring-latch 33 upon the operating-lever. In order to adjust the arm, it is simply necessary to press the handle of the spring-latch inward to disengage it from the notches and to move the operating-lever up or down as may be required. As soon as the spring-latch is released, it engages one of the notches and locks the arm and working-roller at the position in which they have been placed.

In the form shown in Fig. 2, shank 18 is dispensed with, and the arm, instead of swinging, is made to slide in and out in ways 54 in the bed-plate. The operating-lever in this form is pivoted to ears on the under side of the bed. A link 46 is also pivoted to said ears and adjustably connected to the operating-lever.

35 is an operating-rod connecting the lower end of the arm, which extends down through the bed on the opposite side of the machine with the link. It will be noticed that this form is self-locking and dispenses with the locking-plate and spring-latch of the other form. The operating-rod is of course provided with an opening corresponding with opening 19 in shank 18, through which shaft 2 passes. (See dotted lines at 19 in Fig. 2.) The working-roller in this form is carried by a supplemental arm 36, pivoted in a yoke 37, whose shank passes through the arm, and is locked at any desired position by check-nuts 38. The oscillation of the supplemental arm and the roller is limited, or, rather, this adjustment is effected by means of stop-bolts 39 in the arm, which are also locked in position by check-nuts. When it is required to move the working-roller away from the cone, as in removing a hardened body, the operating-lever is pressed down, which forces the operating-rod backward and moves the arm, working-roller, &c., away from the cone. Having placed a new body on the cone, the operating-lever is lifted again, which draws the arm forward and places the roller in contact with the body upon the cone. As soon as the pivotal point of the operating-rod to the link has passed above the pivotal point to the ears, the roller will be locked in its operative position.

It will be noticed that the cone in both forms is made substantially the shape of the cones used in hat-forming machines, and that it is substantially the shape of the bodies as they come from the sizing-machine. In order, however, to compensate for different-sized bodies and to avoid the necessity of shifting the cones, no matter how much the size of the bodies may vary, I provide a tapering curved plate 40, which corresponds in general outline with the cone. This plate is hinged to a block 41, which slides on a dovetail 42 upon the top of the bed, and is locked in position by a set-screw 43. The curved plate is held at any desired adjustment by means of an arm 44, having a hook at its lower end adapted to engage openings in block 41, as indicated in Fig. 3. A spring 45 acts to hold the hook in engagement with either of the openings in the plate. In use, where the bodies are slightly larger than the cone the curved plate is placed at the side of the cone, as shown in the drawings. The body is placed over the cone and plate, and then the latter is adjusted by means of the hooked arm and sliding block, as already explained. In use the hat-body is carried around by the cone, slipping freely over the plate, the action of the plate being simply to hold the body full and to prevent it from folding or creasing when acted upon by the conical working-roller.

The operation of the entire machine is as follows: A body is placed upon the cone and the working-roller adjusted to give the desired pressure upon all portions of the body, and then locked in position, the curved plate, if used, being also adjusted, as already described. These adjustments once fixed need not be changed until the class of hat-bodies being operated upon is changed. The roller is of course thrown into and out of operative position, in the manner described, each time a body is placed on or removed from the cone. In practice the operator usually places a number of bodies in the tank at a time to saturate them with hot water. He takes each body from the tank, places it upon the cone, and starts the machine into operation. In practice it is not common to shift the belt from the tight to the loose pulley each time a body is removed, but simply to throw the arm and working-roller out of operative position. While a body on the cone is being acted upon by the roller, the operator frequently dips water from the tank and splashes it upon the body; or, if preferred, a pipe may be arranged and provided with a suitable cock, so that there may be a continuous flow of water upon the body while on the cone, this arrangement being shown in another pending application of even date herewith. If preferred, each hat-body may be dipped in the tank more than once. The length of time that each body will require to remain upon the cone will depend upon the quality of work done by the sizing-machine, and also upon the presence or absence of creases and marks in the body. The action of the roller is of course to press the water out of the hat-body, rendering the latter firm and smooth. The saturated body is, in fact, ironed out and hardened by the combined action of heat applied from within, and rolling pressure applied externally.

In practice the bodies are rolled until made uniformly smooth and firm, and are entirely free from creases and marks and are nearly dry when removed.

Having thus described my invention, I claim—

1. In combination, a rotating cone adapted to receive a hat-body, a pipe to admit steam to the interior of the cone, a movable arm, and a conical working-roller carried thereby, the upper end of which is provided with an enlargement curving over the top of the cone, as and for the purpose set forth.

2. The combination, with the cone, a hollow shaft by which it is carried, and a pipe within said shaft to admit steam to the interior of the cone, of a movable arm carrying adjustable boxes, and a conical working-roller journaled in said boxes whose contour corresponds with the contour of the cone, the upper end of said roller having an enlargement which curves over the top of the cone so as to act upon the tip of the hat-body.

3. The combination, with a rotating cone, a curved plate hinged to a sliding block, and means for adjusting the angle of said plate relatively to said block, of an adjustable arm, and a conical working-roller carried by said arm and adapted to operate upon a hat-body upon the cone.

4. In a machine of the class described, the rotating cone and a pipe for admitting steam thereto, in combination with the conical working-roller having an enlargement curving over the end of the cone, adjustable blocks in which said roller is journaled, and an adjustable arm by which said blocks are carried.

5. The combination, with a cone and a conical working-roller corresponding therewith in outline, of a movable arm 16, an arm 36, pivoted thereto, by which the roller is carried, an operating-rod connected to arm 16, and an operating-lever to which said rod is connected, said parts being so arranged as to be self-locking in operative position, substantially as described and shown.

6. The cone, the hollow shaft by which it is carried, and a pipe within said shaft to admit steam to the cone, in combination with a conical working-roller having an enlargement curving over the end of the cone, an arm by which it is carried, an operating-rod with an opening to receive the shaft without contact, and an operating-lever pivoted to said rod, as and for the purpose set forth.

7. In a machine of the class described, the combination, with the cone and a conical working-roller having an enlargement curving over the end of the cone, of blocks 15 and 26, in which said roller is journaled, and an adjustable arm by which said blocks are carried.

8. The combination, with the rotating cone and the working-roller, of a curved plate 40, a sliding block by which it is carried, and means, as a hooked rod, for adjusting the angle of the plate.

In testimony whereof I affix my signature in presence of two witnesses.

ABRAHAM T. CLASON.

Witnesses:
NATHAN T. BUCKLEY,
LEVI K. MANSFIELD.